United States Patent
Nishimura

(10) Patent No.: US 9,016,419 B2
(45) Date of Patent: Apr. 28, 2015

(54) HYDRAULIC EXCAVATOR

(71) Applicant: Komatsu Ltd., Tokyo (JP)

(72) Inventor: Minetaka Nishimura, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/003,337

(22) PCT Filed: Nov. 13, 2012

(86) PCT No.: PCT/JP2012/079385
§ 371 (c)(1),
(2) Date: Sep. 5, 2013

(87) PCT Pub. No.: WO2014/076763
PCT Pub. Date: May 22, 2014

(65) Prior Publication Data
US 2014/0133947 A1    May 15, 2014

(51) Int. Cl.
*E02F 9/26* (2006.01)
*E02F 9/08* (2006.01)

(52) U.S. Cl.
CPC .............. *E02F 9/0858* (2013.01); *E02F 9/0833* (2013.01)

(58) Field of Classification Search
CPC .................. E02F 1/00; E02F 3/00; E02F 5/00; E02F 9/00; E02F 9/264; E02F 9/267; H01Q 1/3275
USPC .................. 280/89.13; 37/347, 379, 381, 443
See application file for complete search history.

(56) References Cited

U.S. PATENT DOCUMENTS

| 7,780,213 B2 * | 8/2010 | Kim .............................. 296/37.6 |
| 7,925,439 B2 * | 4/2011 | McCain ........................ 701/468 |
| 2004/0148815 A1 * | 8/2004 | Chikaishi et al. ............... 37/347 |

(Continued)

FOREIGN PATENT DOCUMENTS

| JP | 2002322676 A | * 11/2002 |
| JP | 2005-267568 A |   9/2005 |

(Continued)

OTHER PUBLICATIONS

International Search Report for PCT/JP2012/079385, issued on Feb. 19, 2013.

*Primary Examiner* — Paul N Dickson
*Assistant Examiner* — Darlene P Condra
(74) *Attorney, Agent, or Firm* — Global IP Counselors, LLP

(57) ABSTRACT

A hydraulic excavator includes a lower traveling unit, an upper revolving unit revolvably mounted on the lower traveling unit, a counterweight disposed on a rear end part of the upper revolving unit, an engine compartment disposed in front of the counterweight on the upper revolving unit, a cab disposed in front of the engine compartment on the upper revolving unit, an equipment compartment disposed between the engine compartment and the cab on the upper revolving unit, a pair of handrails and a pair of antenna supporting parts. The pair of handrails is disposed on the equipment compartment. The pair of antenna supporting parts is configured to support a pair of antennas. At least a portion of the pair of antenna supporting parts is disposed above the engine compartment. The pair of antenna supporting parts is connected to the pair of handrails.

10 Claims, 5 Drawing Sheets

(56) References Cited

U.S. PATENT DOCUMENTS

| | | | |
|---|---|---|---|
| 2005/0210718 A1* | 9/2005 | Ueda et al. | 37/466 |
| 2009/0049718 A1* | 2/2009 | Tanaka | 37/443 |
| 2009/0084004 A1* | 4/2009 | Kim | 37/466 |
| 2010/0034421 A1* | 2/2010 | Roberts et al. | 382/100 |
| 2010/0206927 A1* | 8/2010 | Noda et al. | 224/401 |
| 2012/0068432 A1* | 3/2012 | Tanaka et al. | 280/163 |

FOREIGN PATENT DOCUMENTS

| | | | |
|---|---|---|---|
| JP | 2008-102097 A | 5/2008 | |
| JP | 2012-219516 A | 11/2012 | |
| WO | WO2010/147131 | * 12/2010 | 280/163 |

* cited by examiner

HYDRAULIC EXCAVATOR

CROSS-REFERENCE TO RELATED APPLICATIONS

This application is a U.S. National phase application of International Application No. PCT/JP2012/079385 filed on Nov. 13, 2012.

BACKGROUND

The present invention relates to a hydraulic excavator that can be equipped with a GNSS antenna.

Background Information A hydraulic excavator equipped with an antenna for a Real Time Kinematic-Global Navigation Satellite System (RTK-GNSS) is known in the prior art (e.g., see Japanese Patent Laid-open No. 2008-102097). The antennas are mounted on pole-like antenna supporting parts that stand on a counterweight provided at the rear of a upper revolving unit.

SUMMARY

However, large acceleration is applied to the antennas when the upper revolving unit starts or finishes rotating since the counterweight is disposed on the rear end part of the upper revolving unit. As a result, the size and weight of the antenna supporting parts are increased in order to strengthen the antenna supporting parts.

An object of the present invention is to provide a hydraulic excavator that allows for supporting the antennas with small antenna supporting parts in light of the above condition.

A hydraulic excavator according to a first aspect of the present invention comprises an lower traveling unit, a upper revolving unit, a counterweight, an engine compartment, a cab, and a pair of antenna supporting parts for supporting a pair of antennas. The upper revolving unit is revolvably mounted on the lower traveling unit. The counterweight is disposed on a rear end part of the upper revolving unit. The cab is disposed in front of the engine compartment on the upper revolving unit. At least a portion of the pair of antenna supporting parts is located between the engine compartment and the cab.

According to the hydraulic excavator of the first aspect of the present invention, in comparison to a case in which the pair of antenna supporting parts is disposed on the counterweight, the pair of antennas can be disposed closer to the center of rotation of the upper revolving unit. As a result, the pair of antenna supporting parts for supporting the pair of antennas can be made smaller since the acceleration applied to the pair of antennas when the rotation of the upper revolving unit starts or stops can be reduced.

The hydraulic excavator according to a second aspect of the present invention is related to the first aspect, and further comprises an equipment compartment disposed between the engine compartment and the cab on the upper revolving unit. At least a portion of the pair of antenna supporting parts is disposed above the equipment compartment.

The hydraulic excavator according to a third aspect of the present invention is related to the second aspect, and further comprises a pair of handrails disposed on the equipment compartment. The pair of antenna supporting parts is connected to the pair of handrails.

According to the hydraulic excavator according to the third aspect of the present invention, there is no need to provide a separate member for supporting the pair of antenna supporting parts.

The hydraulic excavator according to a fourth aspect of the present invention is related to the second aspect, and further comprises a pair of handrails disposed on the equipment compartment. The pair of antenna supporting parts is a portion of the pair of handrails.

According to the hydraulic excavator according to the fourth aspect of the present invention, there is no need to provide a separate member for supporting the pair of antenna supporting parts.

The hydraulic excavator according to a fifth aspect of the present invention is related to the third aspect, wherein the pair of handrails is disposed on the left and right relative to a center line in the crosswise direction.

According to the hydraulic excavator according to the fifth aspect of the present invention, positional coordinates of the hydraulic excavator can be calculated with high precision on the basis of position information of the pair of antennas since the pair of antennas is disposed away from each other to the right and left relative to the center line.

The hydraulic excavator according to a sixth aspect of the present invention is related to the first to fifth aspects, wherein a pair of antennas is attached to the pair of antenna supporting parts in a detachable manner.

According to the hydraulic excavator according to the sixth aspect of the present invention, the operator can easily attach or detach the pair of antennas at the start or completion of work.

According to the present invention, a hydraulic excavator can be provided that is capable of supporting the antennas with small antenna supporting parts.

DESCRIPTION OF EMBODIMENTS

Figure 1:
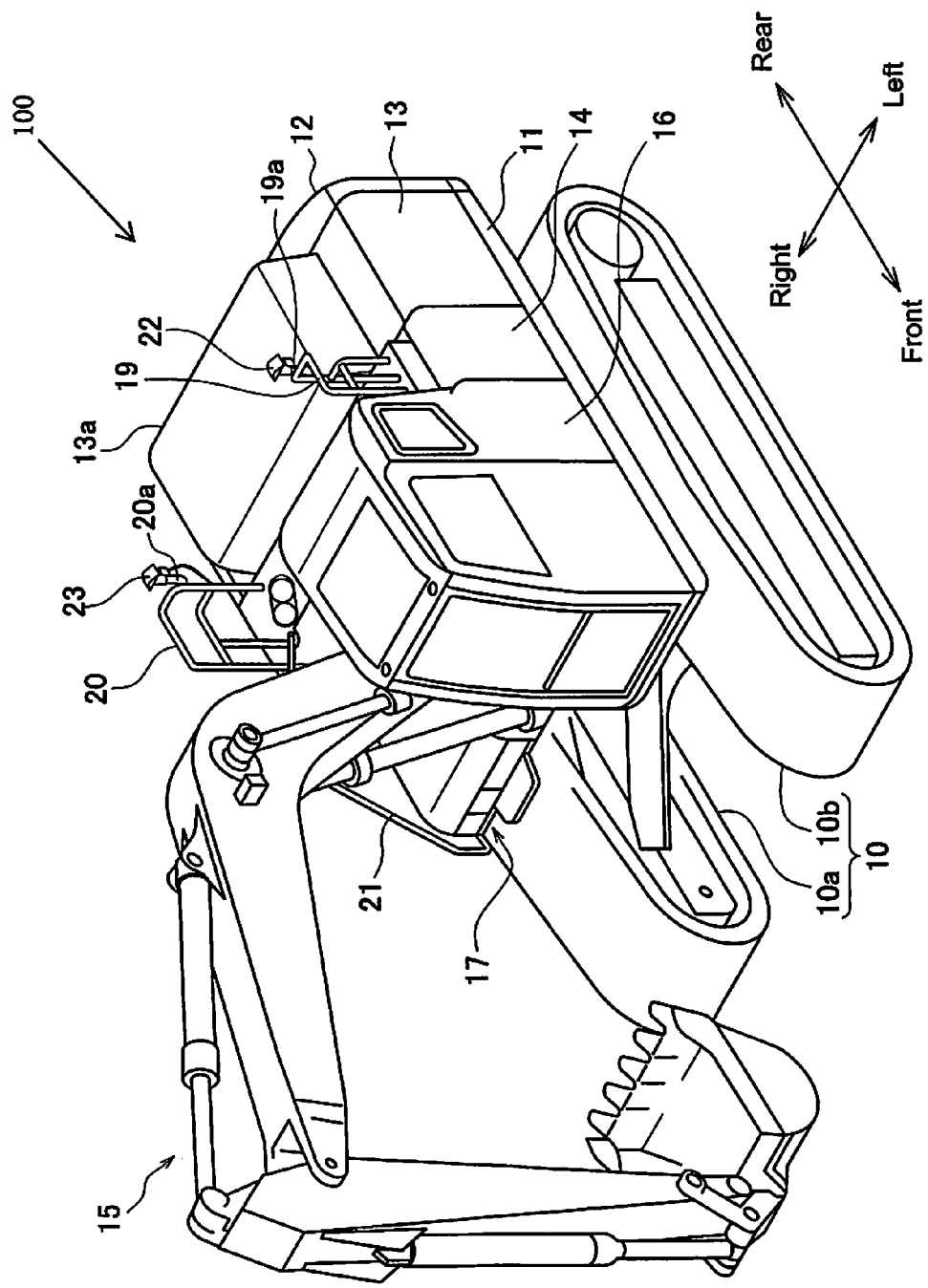
FIG. 1 is a frontal perspective view of a hydraulic excavator.

Next, an embodiment of the present invention will be explained with reference to the drawings. In the following description of the drawings, identical or similar parts are given identical or similar reference numerals. However, the drawings are schematic and dimensional ratios and the like may differ from the actual objects. Therefore, detailed dimensions and the like should be determined in consideration of the following drawings. Moreover, it is needless to say that parts with mutually different dimensional relationships or ratios are included in mutual relationships in the drawings.

In the following description, "up," "down," "front," "rear," "left," and "right" are terms used on the basis of an operator sitting in an operator's seat.

(Configuration of Work Vehicle)

Figure 2:
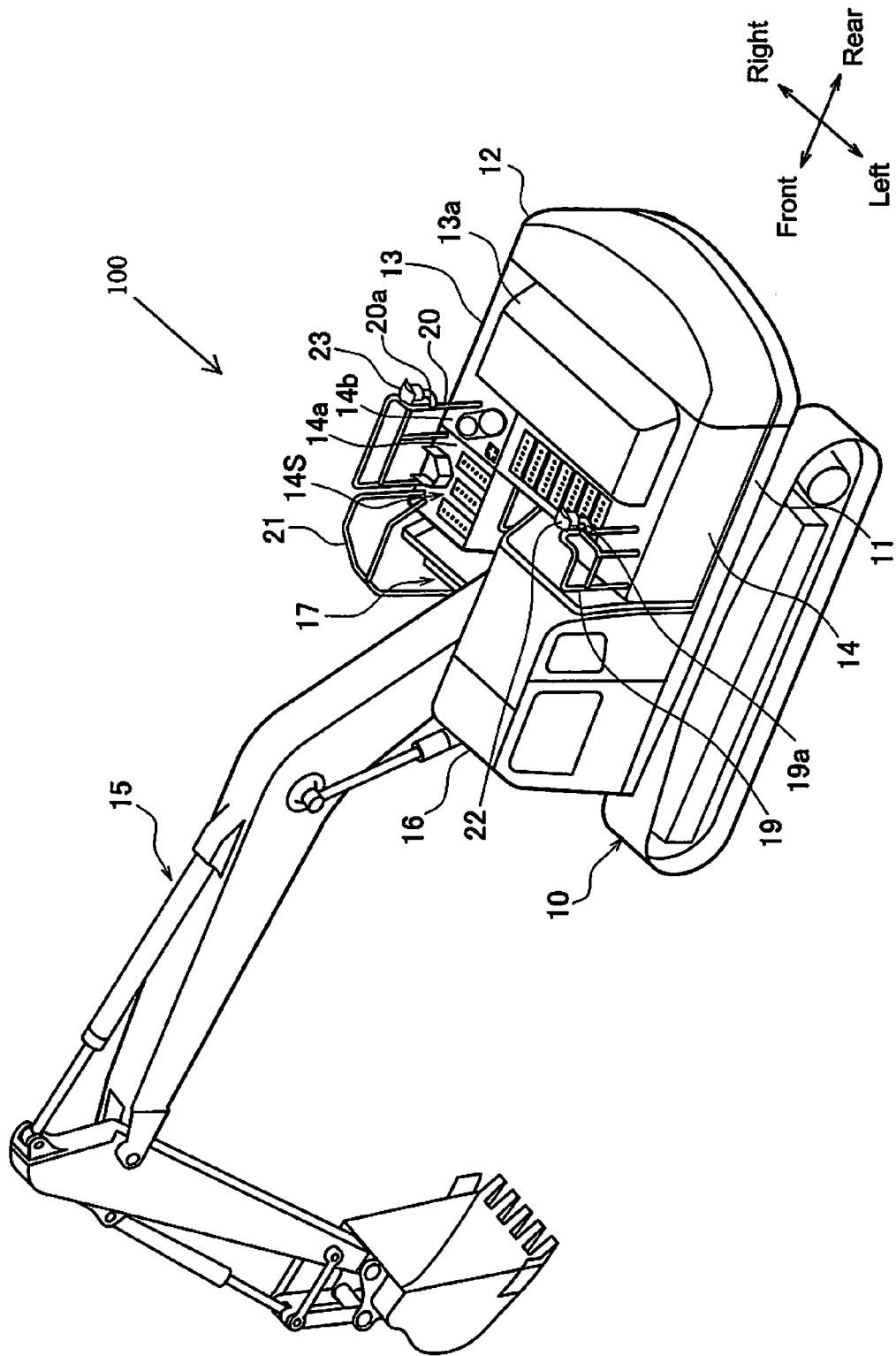
FIG. 2 is a rear perspective view of the hydraulic excavator.

A configuration of a hydraulic excavator 100 according to an embodiment shall be explained in detail with reference to the drawings. FIG. 1 is a front perspective view of the hydraulic excavator 100. FIG. 2 is a rear perspective view of the hydraulic excavator 100.

The hydraulic excavator 100 includes a lower traveling unit 10, an upper revolving unit 11, a counterweight 12, an engine compartment 13, an equipment compartment 14, work implement 15, a cab 16, a steps 17, a first handrail 19, a second handrail 20, a third handrail 21, a first GNSS antenna 22, and a second GNSS antenna 23.

The lower traveling unit 10 includes a pair of rotatable crawlers 10a, 10b that operate independently of each other. The hydraulic excavator 100 moves back and forth and left and right by rotating the pair of crawlers 10a, 10b.

The upper revolving unit 11 is mounted in a rotatable manner on the lower traveling unit 10. The upper revolving unit 11 is rotatable about a center of rotation CP (see FIG. 3) that is parallel to the vertical direction. The upper revolving unit 11 constitutes the vehicle body frame of the hydraulic excavator 100. The counterweight 12, the equipment compartment 14, the engine compartment 13, and the cab 16 are disposed on the upper revolving unit 11

The counterweight 12 is disposed on the rear end part of the upper revolving unit 11. The counterweight 12 is formed by inserting waste steel or concrete into a box assembled from steel plates. The counterweight 12 is used to maintain balance while doing excavation work and the like.

The engine compartment 13 is disposed on the upper revolving unit 11. The engine compartment 13 is disposed in front of the counterweight 12. The engine compartment 13 is disposed behind the equipment compartment 14. The engine compartment 13 accommodates an engine and an exhaust gas treatment device and the like that are not illustrated in the drawings. An engine hood 13 that can be opened and closed is disposed above the engine compartment 13. The operator can stand on a passage 18 and open the engine hood 13 when conducting maintenance inside the engine compartment 13.

The equipment compartment 14 is disposed between the engine compartment 13 and the work implement 15 and between the engine compartment 13 and the cab 16 on the upper revolving unit 11. The equipment compartment 14 includes a fuel tank 14a and an operating fluid tank 14b. In the present embodiment, an upper surface 14S of the equipment compartment 14 is formed in an L shape as illustrated in FIG. 2.

The work implement 15 is mounted in a swingable manner at the front side of the upper revolving unit 11. The work implement 15 is disposed in front of the equipment compartment 14. The work implement 15 is supported by the upper revolving unit 11 between the cab 16 and the steps 17.

The cab 16 is disposed on the upper revolving unit 11. The cab 16 is provided in front of the equipment compartment 14 and to the left of the work implement 15 to allow the operator to view the movement of the work implement 15. An operator's seat in which the operator sits is provided inside the cab 16.

The steps 17 is disposed at the front right of the equipment compartment 14. The steps 17 is used for climbing up and down between the ground and the passage 18.

The passage 18 is formed on the equipment compartment 14. The passage 18 is a substantially flat area of the upper surface 14S of the equipment compartment 14. In other words, the passage 18 is an area where the operator can place his feet of the upper surface 14S of the equipment compartment 14. The passage 18 according to the present embodiment is formed in an L shape in accordance with the shape of the upper surface 14S of the equipment compartment 14. A non-slip conduct is applied to the surface of the passage 18. Specifically, a plurality of half-spherical protrusions are formed on the surface of the passage 18. The non-slip conduct may be formed on the surface of the passage 18.

The first and second handrails 19, 20 are disposed on the equipment compartment 14. The first and second handrails 19, 20 are provided at the edges of the passage 18 and are used by the operator standing on the passage 18 to support his body. The first handrail 19 and the second handrail 20 are separated from each other in the left-right direction. Thus, the operator standing between the first handrail 19 and the second handrail 20 is able to open the engine hood 13a to conduct maintenance inside the engine compartment 13. The first handrail 19 is disposed on the left end of the equipment compartment 14. The second handrail 20 is disposed on the right end of the equipment compartment 14. The second handrail 20 is disposed on the fuel tank 14a and the operating fluid tank 14b.

In the present embodiment, both the first and second handrails 19, 20 take the form of an L shape when viewed from above. Specifically, one side of the L shape extends in the front-back direction along the both side edges of the upper revolving unit 11, and the other side of the L shape extends from the rear end of the one side toward the inside of the upper revolving unit 11.

A first antenna supporting part 19a is connected to the first handrail 19. The first antenna supporting part 19a is a bracket for attaching the first GNSS antenna 22. Similarly, a second antenna supporting part 20a is connected to the second handrail 20. The second antenna supporting part 20a is a bracket for attaching the second GNSS antenna 23. Disposition and configuration of the first and second antenna supporting parts 19a, 20a are explained below.

The third handrail 21 is disposed in front of the first handrail 19 and to the right of the steps 17. The third handrail 21 is used by the operator to support his body while ascending and descending the steps 17.

The first and second GNSS antennas 22, 23 are antennas used for a Real Time Kinematic-Global Navigation Satellite System (RTK-GNSS). The first and second GNSS antennas 22, 23 are disposed above the passage 18. The first GNSS antenna 22 is attached to the first antenna supporting part 19b of the first handrail 19. The second GNSS antenna 22 is attached to the second antenna supporting part 20b of the second handrail 20.

(Disposition of First And Second Antenna Supporting Parts 19a, 20a)

Figure 3:
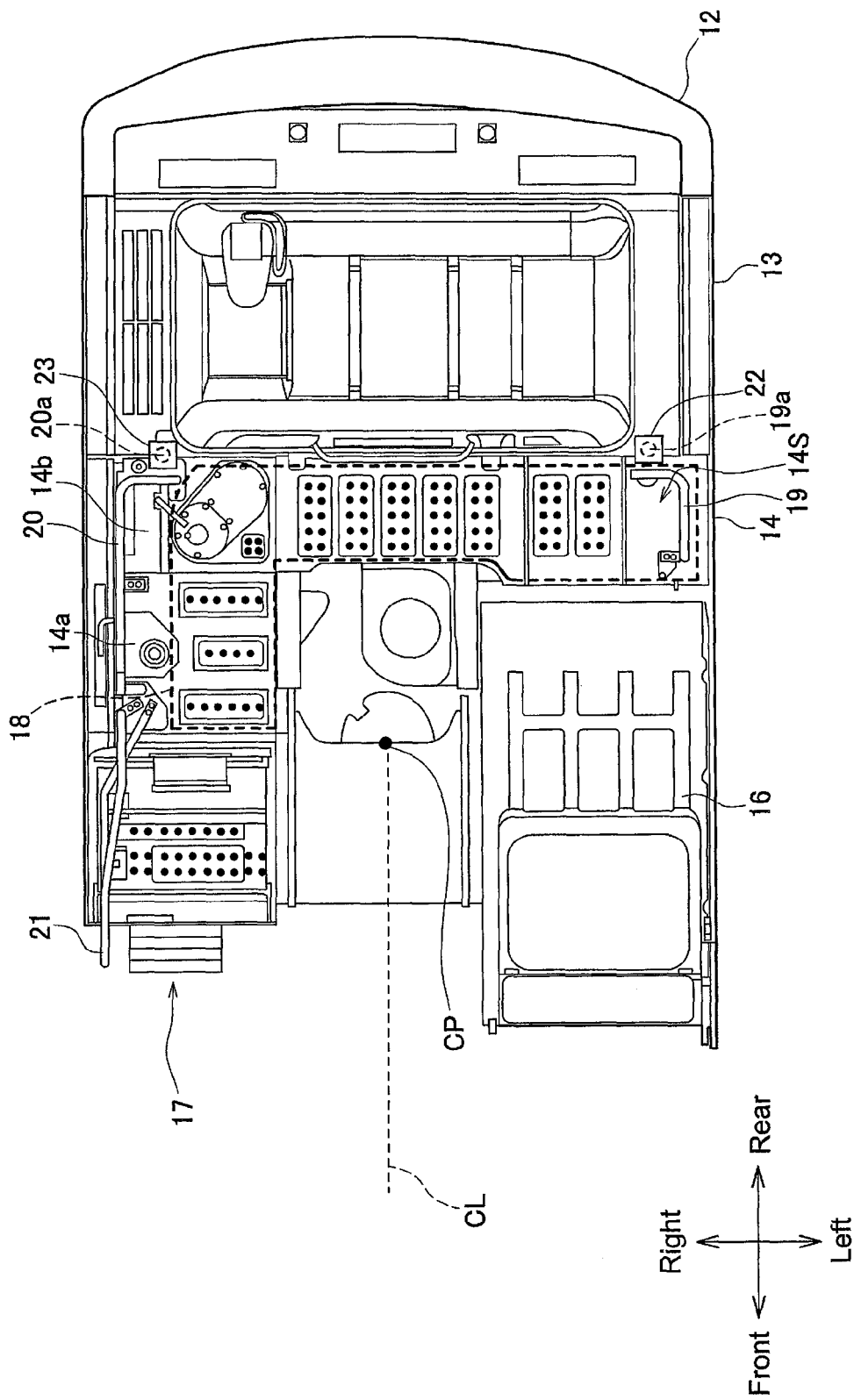
FIG. 3 is a top view of an equipment compartment.

Next, the disposition of the first and second antenna supporting parts 19a, 20a is described with reference to the drawing. FIG. 3 is a top view of the upper revolving unit 11 and illustrates the location of the equipment compartment 14 and the like.

The first and second antenna supporting parts 19a, 20a are located on a boundary line between the engine compartment 13 and the equipment compartment 14. The front side portions of the first and second antenna supporting parts 19a, 20a are located above the equipment compartment 14. The rear side portions of the first and second antenna supporting parts 19a, 20a are located above the engine compartment 13. In this way, the front side portions of the first and second antenna supporting parts 19a, 20a are located between the engine compartment 13 and the cab 16 in the front-back direction.

Since the center of rotation CP of the upper revolving unit 11 is located to the right of the cab 16, the first and second antenna supporting parts 19a, 20a are located to the rear of the center of rotation CP.

The first and second antenna supporting parts 19a, 20a are respectively connected to the first and second handrails 19, 20. The first and second handrails 19, 20 are separated from each other to the left and right relative to the center line CL in the front-rear direction of the hydraulic excavator 100, as shown in FIG. 3. The first and second antenna supporting parts 19a, 20a are disposed to the right and left relative to the center line CL. The first and second antenna supporting parts 19a, 20a according to the present embodiment are located symmetrically on the right and left relative to the center line CL.

The first and second antenna supporting parts 19a, 20a are respectively located to the rear of the first and second handrails 19, 20. The first and second antenna supporting parts 19a, 20a are located to the rear of the passage 18.

Since the first and second GNSS antennas 22, 23 are respectively attached to the first and second antenna supporting parts 19a, 20a, the disposition locations of the first and second GNSS antennas 22, 23 are similar to the disposition locations of the abovementioned first and second antenna supporting parts 19a, 20a.

(Configuration of First And Second Antenna Supporting Parts 19a, 20a)

Next, the configuration of the first and second antenna supporting parts 19a, 20a is explained with reference to the drawings. The following is an explanation of the configuration of the second antenna supporting part 20a since the first and second antenna supporting parts 19a, 20a have the same configuration.

Figure 4:
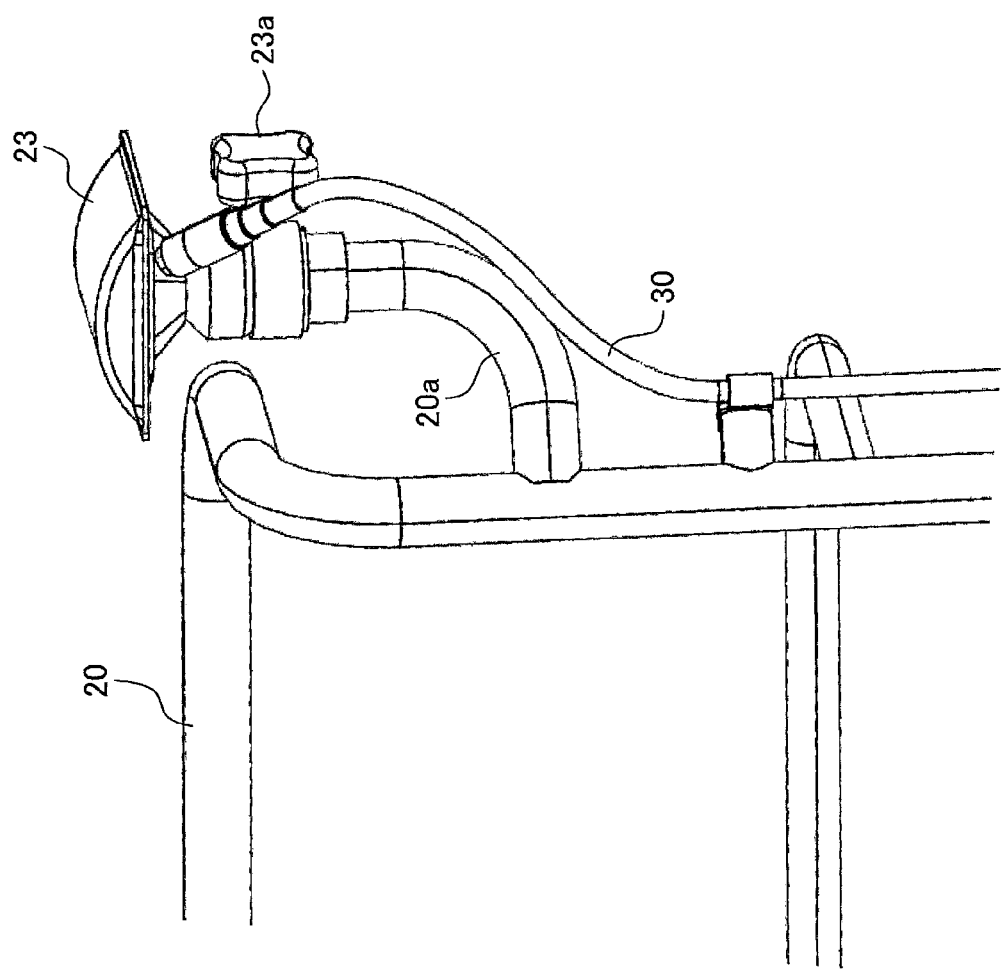
FIG. 4 illustrates a configuration of the pair of antenna supporting parts.
Figure 5:
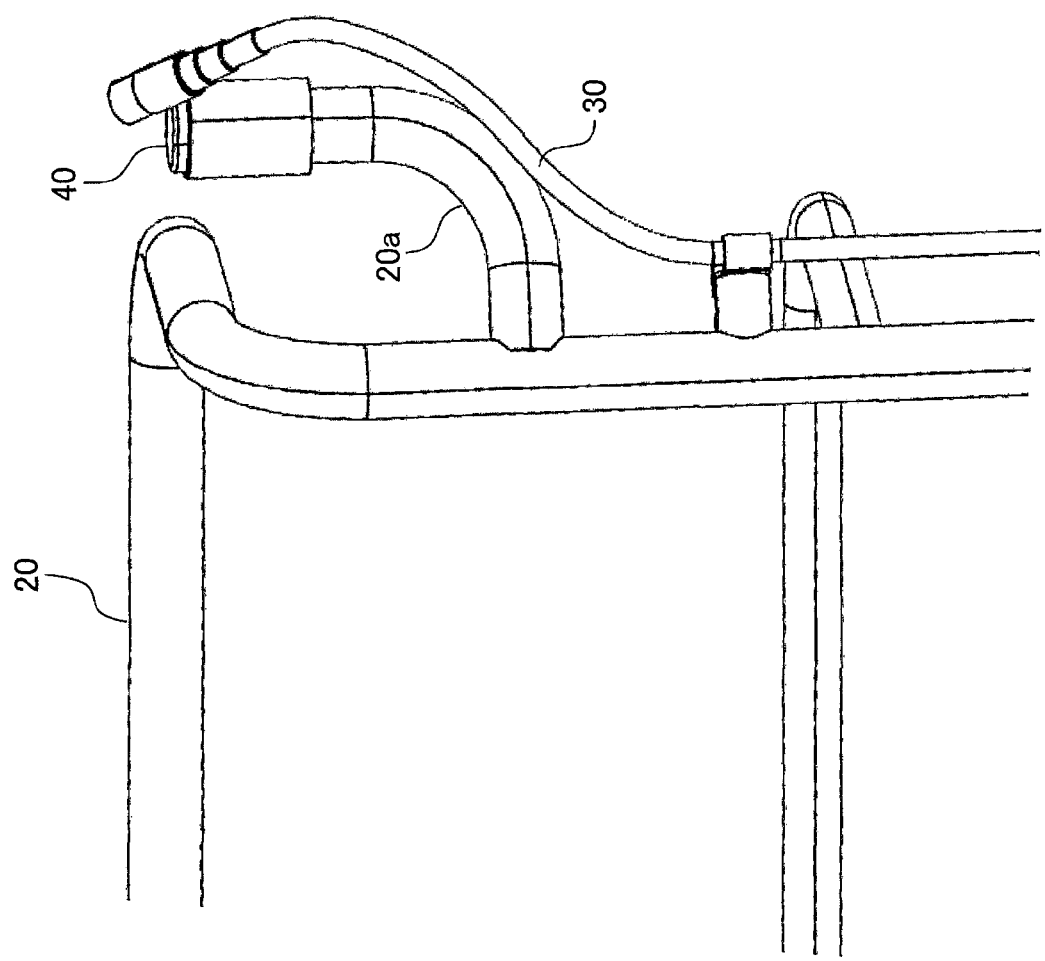
FIG. 5 illustrates a configuration of the pair of antenna supporting parts.

FIG. 4 illustrates a condition in which the second GNSS antenna 23 is attached to the second antenna supporting part 20a. FIG. 5 illustrates a condition in which the second GNSS antenna 23 is removed from the second antenna supporting part 20a.

The second antenna supporting part 20a is a bracket configured by a circular tube bent into an L shape. The second antenna supporting part 20a extends backward and upward from the rear part of the second handrail 20. The second antenna supporting part 20a is disposed on the side opposite to the passage 18 with the second handrail 20 interposed therebetween since the passage 18 is in front of the rear part of the second handrail 20. Since the second GNSS antenna 23 is to the outside of the passage with the handrail interposed therebetween due to this disposition, unexpected contact with the second GNSS antenna 23 due to someone moving along the passage can be avoided. The height of the second antenna supporting part 20a is preferably similar to that of the second handrail 20.

As illustrated in FIG. 4, the second GNSS antenna 23 is disposed on the second antenna supporting part 20a. The second GNSS antenna 23 is preferably disposed in a position higher than the second handrail 20 in order to properly receive GNSS satellite radio waves. The second GNSS antenna 23 has a knob 23a for connecting the second GNSS antenna 23 to the second antenna supporting part 20a. A cable 30 for transmitting position information to a controller is connected to the second GNSS antenna 23.

The second GNSS antenna 23 is preferably disposed in a position higher than the upper surface of the cab 16 in order to properly receive GNSS satellite radio waves.

As illustrated in FIG. 5, a cap 40 is fitted onto the second antenna supporting part 20a when the second GNSS antenna 23 is removed.

(Actions And Effects)

The front side portions of the first and second antenna supporting parts 19a, 20a are located between the engine compartment 13 and the cab 16 in the front-back direction.

Therefore, the first and second GNSS antennas 22, 23 can be located closer to the center of rotation CP than a case in which the first and second antenna supporting parts 19a, 20a are disposed on the counterweight 12. As a result, the first and second antenna supporting parts 19a, 20a that respectively support the first and second GNSS antennas 22, 23 can be made smaller since the acceleration applied to the first and second GNSS antennas 22, 23 when the rotation of the upper revolving unit 12 starts or stops can be reduced.

(2) The first and second antenna supporting parts 19a, 20a are respectively connected to the first and second handrails 19, 20.

Therefore, there is no need to provide separate members to support the first and second antenna supporting parts 19a, 20a.

(3) The first and second antenna supporting parts 19a, 20a are disposed on the right and left relative to the center line CL in the front-rear direction, as shown in FIG. 3.

Therefore, the first and second GNSS antennas 22, 23 are disposed away from each other on the left and right relative to the center line CL. As a result, the positional coordinates of the hydraulic excavator 100 can be calculated with high precision on the basis of the position information of the first and second GNSS antennas 22, 23.

(4) The first and second GNSS antennas 22, 23 (example of a pair of antennas) are removably attached to the first and second antenna supporting parts 19a, 20a.

Therefore, the operator is able to easily attach or remove the first and second GNSS antennas 22, 23 when starting or finishing work.

(Other Embodiments)

While the present invention has been described with the embodiment provided above, the description and drawings form a portion of the disclosure and are not to be understood as limiting the invention. Various substitutions, embodiments, and operation techniques will be apparent to those skilled in the art.

(A) While only the front side portions of the first and second antenna supporting parts 19a, 20a are located between the engine compartment 13 and the cab 16 in the front-back direction in the above embodiment, the present invention is not limited as such. All parts of the first and second antenna supporting parts 19a, 20a may be located between the engine compartment 13 and the cab 16 in the front-back direction. Moreover, only the rear side portions of the first and second antenna supporting parts 19a, 20a may be located between the engine compartment 13 and the cab 16 in the front-back direction.

(B) While the first and second GNSS antennas 22, 23 are respectively attached in a detachable manner to the first and second antenna supporting parts 19a, 20a in the above embodiment, the present invention is not limited as such. The first and second GNSS antennas 22, 23 may be respectively fixed to the first and second antenna supporting parts 19a, 20a.

(C) While the first and second antenna supporting parts 19a, 20a are connected respectively to the pair of handrails 19, 20 in the above embodiment, the present invention is not limited as such. The first and second antenna supporting parts 19a, 20a may be connected directly onto the equipment compartment 14 and the like.

(D) While the first and second antenna supporting parts 19a, 20a are positioned respectively to the rear of the first and second handrails 19, 20 in the above embodiment, the present invention is not limited as such. The first and second antenna supporting parts 19a, 20a may be respectively positioned in front of or to the side the first and second handrails 19, 20.

(E) While the first and second antenna supporting parts 19a, 20a are described as being configured separately from the first and second handrails 19, 20 in the above embodiment, the first and second antenna supporting parts 19a, 20a may respectively be a portion of the first and second handrails 19, 20.

As described above, it is a matter of course that the present invention incorporates a variety of preferred embodiments which are not described herein. Hence the technical scope of the present invention is defined only by matters to define the invention, which are according to the scope of claims, reasonable from the above description.

INDUSTRIAL APPLICABILITY

The present invention is useful in the field of hydraulic excavators since the antennas can be supported by small antenna supporting parts according to the hydraulic excavator of the present invention.

What is claimed is:

1. A hydraulic excavator comprising:
   a lower traveling unit;
   an upper revolving unit revolvably mounted on the lower traveling unit;
   a counterweight disposed on a rear end part of the upper revolving unit;
   an engine compartment disposed in front of the counterweight on the upper revolving unit;
   a cab disposed in front of the engine compartment on the upper revolving unit;
   an equipment compartment disposed between the engine compartment and the cab on the upper revolving unit;
   a passage on the equipment compartment extending across a center line extending in a front-rear direction of the hydraulic excavator;
   a pair of handrails disposed on the equipment compartment; and
   a pair of antenna supporting parts configured to support a pair of antennas, the pair of antenna supporting parts being disposed on the left and right relative to the front-rear center line of the hydraulic excavator, at least a portion of the pair of antenna supporting parts being disposed above the engine compartment, and the pair of antenna supporting parts being connected to the pair of handrails.

2. The hydraulic excavator according to claim 1, wherein the pair of antenna supporting parts is a portion of the pair of handrails.

3. The hydraulic excavator according to claim 1, wherein the pair of handrails is disposed on the left and right relative to the center line.

4. The hydraulic excavator according to claim 1, further comprising
   a pair of antennas removably attached to the pair of antenna supporting parts.

5. The hydraulic excavator according to claim 2, further comprising:
   a pair of antennas removably attached to the pair of antenna supporting parts.

6. The hydraulic excavator according to claim 3, further comprising:
   a pair of antennas removably attached to the pair of antenna supporting parts.

7. The hydraulic excavator according to claim 1, wherein a pair of antennas are mounted on the pair of antenna supporting parts.

8. The hydraulic excavator according to claim 1, wherein the passage extends from one of the pair of antennas to the other of the pair of antennas.

9. The hydraulic excavator according to claim 1, wherein the pair of handrails is provided on the passage, one handrail being on one side of the center line and the other handrail being on the other side of the center line.

10. The hydraulic excavator according to claim 1, wherein the passage is substantially L-shaped.

* * * * *